United States Patent [19]

Su

[11] Patent Number: 6,124,417

[45] Date of Patent: *Sep. 26, 2000

[54] WATER-ACTIVATABLE POLYMERS FOR INK-JET IMPRINTABLE CONSTRUCTIONS

[75] Inventor: Shiaonung Su, Buena Park, Calif.

[73] Assignee: Avery Dennison Corporation, Pasadena, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/071,502

[22] Filed: May 1, 1998

Related U.S. Application Data

[63] Continuation-in-part of application No. 08/701,767, Aug. 26, 1996, Pat. No. 5,969,069, which is a continuation-in-part of application No. 08/519,570, Aug. 25, 1995, abandoned.

[51] Int. Cl.$^7$ .................................................. C08F 220/10
[52] U.S. Cl. ..................... 526/318.44; 526/318.4
[58] Field of Search ............................. 526/318.44, 318.4

[56] References Cited

U.S. PATENT DOCUMENTS

| | | | |
|---|---|---|---|
| 3,441,430 | 4/1969 | Peterson | 117/68.5 |
| 3,681,179 | 8/1972 | Theissen | 161/4 |
| 4,052,368 | 10/1977 | Larson | 260/75 |
| 4,074,004 | 2/1978 | Bateson et al. | 526/318.4 |
| 4,172,824 | 10/1979 | Harrington, Jr. et al. | 260/31.2 X |
| 4,181,752 | 1/1980 | Martens et al. | 526/318.4 |
| 4,325,581 | 4/1982 | Pickering | 303/22 |
| 4,331,576 | 5/1982 | Colon et al. | 524/271 |
| 4,339,485 | 7/1982 | Shibano et al. | 428/40 |
| 5,070,164 | 12/1991 | Min et al. | 526/318.4 |
| 5,326,644 | 7/1994 | Scholz et al. | 428/514 |
| 5,346,977 | 9/1994 | Sakai et al. | 526/318.4 |
| 5,407,718 | 4/1995 | Popat et al. | 428/42 |
| 5,536,787 | 7/1996 | Scholz et al. | 526/318.4 |

FOREIGN PATENT DOCUMENTS

| | | |
|---|---|---|
| 1 103 099 | 6/1981 | Canada . |
| 0297451 | 1/1986 | European Pat. Off. . |
| 0199468 | 10/1986 | European Pat. Off. . |
| 58-185667 | 10/1983 | Japan . |
| 1 356 030 | 6/1974 | United Kingdom . |

OTHER PUBLICATIONS

Hackh's Chemical Dictionary By Grant May 27, 1981—pp. 17 and 167.

Primary Examiner—Bernard Lipman
Attorney, Agent, or Firm—Christie, Parker & Hale, LLP

[57] ABSTRACT

Water-activatable acrylic polymers and image transfer constructions made therewith are provided. The polymers are non-tacky to the touch when dry, but become tacky when activated by water, such as the water in the ink of an ink jet printer. The polymers are acrylic copolymers prepared by emulsion polymerization of a monomer mixture that preferably includes at least one alkyl acrylate, methyl acrylate, vinyl acetate, methacrylic acid and acrylic acid. Image transfer sheets made with the water-activatable polymers include a flexible backing, at least one water-impermeable layer, at least one layer of water-activatable polymers, and a protective detack layer.

8 Claims, 1 Drawing Sheet

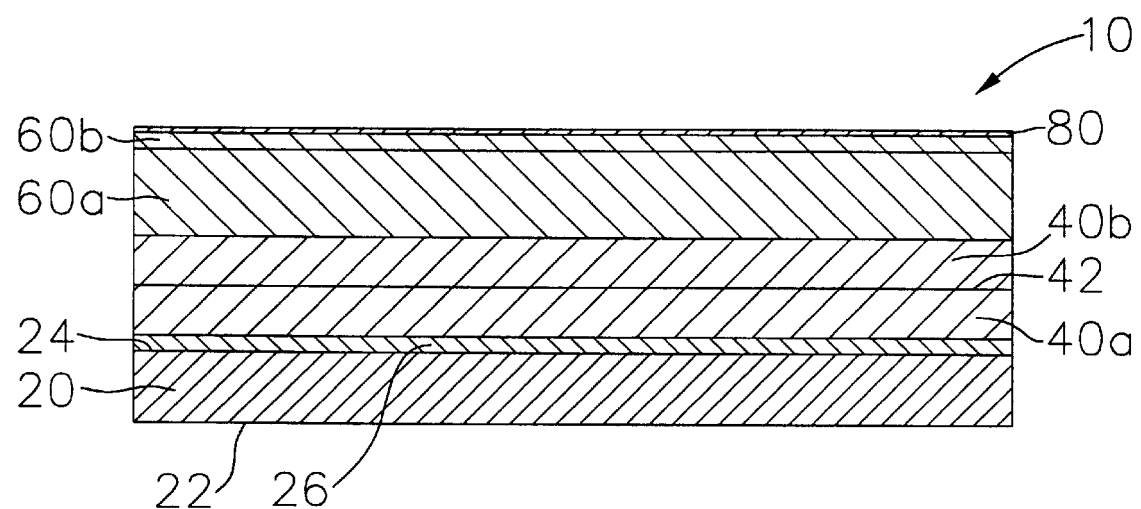

WATER-ACTIVATABLE POLYMERS FOR INK-JET IMPRINTABLE CONSTRUCTIONS

RELATION TO PATENT APPLICATIONS

This is a continuation-in-part of U.S. patent application Ser. No. 08/701,767, filed Aug. 26, 1996 U.S. Pat. No. 5,969,069, which is a continuation-in-part of U.S. patent application Ser. No. 08/519,570, filed Aug. 25, 1995 abandoned, the contents of both applications being incorporated by reference herein.

FIELD OF THE INVENTION

This invention relates to water-activatable polymers that are ink jet imprintable and can be used for adhesive image transfer, and constructions made with such polymers.

BACKGROUND OF THE INVENTION

Labels, tapes and similar constructions are ubiquitous in modern society. Many such constructions include a release liner coated with adhesive, such as a pressure-sensitive adhesive (PSA), which is laminated to a paper or film face stock. Removal of the release liner allows the construction—face stock coated with adhesive—to be adhered to a substrate.

Most PSAs are tacky when dry and cannot readily be used with ink jet printers. Moreover, such PSAs typically are not hydrophilic, making it difficult to print on them directly with water-based ink jet printer inks. Instead, only the face stock or liner is ink-receptive. The unsuitability of such PSAs for use in ink jet printers is compounded by the tendency of the adhesives to block the printer ports in the printers.

Although attempts have been made to formulate water-activatable adhesives, many of the adhesives produced to date have been rubber-based and, therefore, subject to oxidative and UV degradation. Many rubber-based and other adhesives have been solvent borne, and thus objectional for environmental, health and safety reasons. The following patents are representative. U.S. Pat. No. 3,681,179 to Theissen discloses a solar control film construction having a water-activatable adhesive system comprising a film coated with a normally tacky and pressure-sensitive adhesive, which is covered by a thin, tack-free, continuous water-soluble layer. A tack-free emulsion acrylic adhesive is not disclosed.

European Patents Nos. 199,468 and 297,451 describe a method for compounding water-activatable hot melt adhesives comprising polyaklylenimine or other vinyl heterocyclicmonomers, a hydroxy-substituted organic compound, a plastizier, tackifier, and This paper or fee is being deposited with the filler, and an antioxidant. No mention is made of making water-activatable emulsion acrylic adhesives.

U.S. Pat. Nos. 4,331,576 and 4,325,581 to Pickering disclose common water-soluble hot melt adhesives based on polymers containing vinyl pyrrolidone and other heterocyclic monomers. Emulsion acrylics are not disclosed.

U.S. Pat. No. 4,052,368 to Larson and U.S. Pat. No. 4,172,824 to Harrington describe water sensitive hot melt adhesives including polyester-based adhesives which typically comprise a copolyester in combination with a plasticizer. The systems are not emulsion acrylics.

None of the above-identified patents disclose or suggest the possibility of making a hydrophilic, acrylic emulsion polymer that is non-tacky when dry and water-activatable to become an adhesive, and that can be used in a "label-less" or "liner-less" construction, i.e., respectively, a construction in which either a face stock or a liner is not required.

SUMMARY OF THE INVENTION

In accordance with the present invention, there are provided water-receptive, water-dispersible, acrylic polymers that are non-tacky when dry but become tacky when wet, and which are particularly useful as water-activatable adhesives for image transfer constructions. In one embodiment of the invention, the composition comprises an acrylic-based polymer prepared by emulsion polymerization of a monomer mixture comprising, based on the total weight of monomers, from about 40 to 70% by weight of one or more alkyl acrylates, the alkyl group of which has from 4 to about 8 carbon atoms; from about 5 to 15% by weight of methyl acrylate; from about 7 to about 17% by weight of vinyl acetate; and from about 10 to 25% by weight of methacrylic acid and/or acrylic acid.

Despite having moderate glass transition temperatures (e.g., from about −20° C. to 0° C. in some formulations), the polymers can be cast as continuous films that, when dry, are non-tacky to the touch at room temperature, but when exposed to moisture, such as the water in an ink jet printer ink, become tacky. Films cast from the emulsion polymers are water-receptive or hydrophilic, repulpable, water-activatable and transparent to visible light. They can be directly printed upon using a water-based ink and, after activation and adhesion to a substrate, can be removed from a substrate by application of water. They are particularly useful as ink jet-imprintable polymers for convertible, decorative adhesive image sheets and similar constructions, and provide up to 100% image transfer at room temperature, using manual pressure. In contrast, most commercially available image transfer sheets provide no more than about 60 to 80% image transfer.

In another aspect of the invention, an ink jet-imprintable, water-activatable adhesive construction is provided. In one embodiment, the construction comprises at least one layer of water-activatable acrylic polymers, coated on at least one water-impermeable layer, such as a layer of UV varnish, which is applied to a coated or uncoated flexible backing (i.e., a release liner). A continuous, water-soluble, protective detack layer is coated on the water-activatable acrylic polymer layer(s). The water-activatable layer is non-tacky when dry, but becomes tacky when exposed to water. Consequently, when printed with a water-based ink jet printer ink, the detack layer dissolves within the region of the printed image, and the polymer layer(s) become tacky within the region of the printed image, but not in other regions that were not directly printed on. The construction is useful as a label or decorative image sheet, and is applied to an object or surface by adhering the water-activated polymer (which is now tacky) to the object and, removing some or all of the flexible substrate or liner.

Other features and advantages of the invention will become apparent from a consideration of the following detailed description and the accompanying drawings.

BRIEF DESCRIPTION OF THE DRAWING

The FIGURE is a schematic, cross-sectional illustration of one embodiment of an ink jet-imprintable, water-activatable construction prepared in accordance with the present invention.

DETAILED DESCRIPTION OF THE INVENTION

The present invention provides acrylic polymers that are non-tacky when dry, yet hydrophilic, water-dispersible, and water-activatable—even by a small amount of moisture, such as the water in the ink of a personal ink jet printer—and become tacky and functional as a pressure-sensitive adhesive. When applied to a substrate, the activated adhesives adhere to the substrate yet are removable by further application of water. Advantageously, the adhesives are receptive to the inks used in ink jet printers, including colored inks, and are transparent to visible light. The adhesives may also be receptive to inks containing metal flakes or pigments.

In one embodiment of the invention, the acrylic polymers are prepared by emulsion polymerization of a monomer mixture comprising, on a percent by weight basis, based on the total weight of monomers (a) from about 40 to 70% of at least one alkyl acrylate having an alkyl group containing 4 to about 8 carbon atoms, with a mixture of two such alkyl acrylates being preferred; (b) from about 5 to 15% of methyl acrylate; (c) from about 5 to 20% of vinyl acetate; and (d) from about 5 to 25% of one or more of methacrylic acid and acrylic acid, with a mixture of the two—e.g., from about 1 to 5% methacrylic acid and from about 5 to 20% acrylic acid—being more preferred.

In a presently preferred embodiment (Example 2, below), the monomer mixture contains no methyl methacrylate. In other embodiments, the monomer mixture can include up to about 5% by weight, more preferably less than about 3.5% by weight, of methyl methacrylate, based on the total weight of monomers.

As stated above, it is preferred to employ a mixture of alkyl acrylates as the first monomeric component. Useful alkyl acrylates include n-butyl acrylate, 2-ethylhexyl acrylate, isooctyl acrylate, and the like. A mixture of 2-ethylhexyl acrylate and butyl acrylate is preferred. Similarly, it is preferred to employ a mixture of acrylic and methacrylic acid as the fourth monomeric component of the polymers. The acid monomers impart polarity and hydrophilicity to the resulting polymers.

The identity and relative amounts of monomers used to form the polymers are selected so that the polymers have a sufficiently high glass transition temperature ($T_g$) and/or other properties (e.g., high plateau modulus) such that the polymers are non-tacky to the touch at room temperature, when dry. To that end, it is preferred to use a substantial amount of vinyl acetate and/or the acid monomers.

As used herein, the term "non-tacky to the touch" means that the copolymers, when cast as a film and dried, do not feel sticky, under conditions of room temperature (about 20–25° C.) and normal relative humidity (less than about 25% RH). The copolymers appear to remain non-tacky even at higher humidities, though, if the humidity becomes sufficiently high, the copolymers may begin to absorb atmospheric moisture and start to become tacky. A detack layer (described below) is advantageously overlaid on the copolymers to protect them from high atmospheric humidity.

In a preferred embodiment, the monomer mixture comprises, on a percent-by-weight basis, based on the total weight of monomers, from about 10 to 20% butyl acrylate; from about 40 to 60% 2-ethylhexy acrylate; from about 5 to 15% methyl acrylate; from about 10 to 20% vinyl acetate; from about 5 to 20% acrylic acid; and from about 1 to 5% methacrylic acid. In a particularly preferred embodiment, the monomer amounts are, approximately, 12% butyl acrylate, 48% 2-ethylhexyl acrylate; 9% methyl acrylate; 12% vinyl acetate; 16% acrylic acid; and 3% methacrylic acid.

The water-activatable acrylic copolymers are prepared by free-radical emulsion polymerization, preferably in an oxygen-free environment, in the presence of suitable polymerization initiators and emulsifiers (surfactants). Enough surfactant is included to form a stable emulsion without causing phase separation. One or more activators, redox agents and chain transfer agents also are preferably employed in the preparation of the polymers.

Although a variety of nonionic, anionic, and/or cationic surfactants can be used to prepare the acrylic copolymers, it is preferred to employ a mixture of two or more surfactants, for example, Disponil FES77, a sodium lauryl ether sulfate surfactant, available from Henkel of America, Inc. (King of Prussia, Pa.); TSPP (sodium pyrophosphate), available from J. T. Baker (Mallinckrodt Baker, Inc., Phillipsburg, N.J.); and Aerosol OT-75, a sodium dioctyl sulfusccinate surfactant, available from American Cyanamid (Wayne, N.J.). Other nonlimiting examples of useful surfactants include cetyl trimethyl ammonium bromide, available from Aldrich (Milwaukee, Wis.); AR-150, a nonionic, ethoxylated rosin acid emulsifier available from Hercules, Inc. (Wilmington, Del.); Alipal CO-436, a sulfated nonylphenol ethoxylate available from Rhone-Poulenc; Trem LF40, a sodium alkyl allyl sulfosuccinate surfactant, available from Henkel of America, Inc.; Polystep F-9, a nonylphenol ethoxylate, and Polystep B-27, a sodium nonylphenol ethoxylated sulfate, both available from Stepan Company, Inc. (Winnetka, Ill.); and disodium ethoxylated alkyl alcohol half esters of sulfosuccinic acid, described in U.S. Pat. No. 5,221,706 (incorporated by reference herein), and available from VWR Scientific Corp., Sargent-Welch Division (Westchester, Pa.). Other surfactants include the Triton X-series of surfactants made by Union Carbide (Danbury, Conn.). In general, one probably would not employ both a cationic and an anionic surfactant in the same polymerization reaction. Anionic plus nonionic surfactant combinations, however, are readily used to prepare the emulsion copolymers described herein.

Nonlimiting examples of useful polymerization initiators include water-soluble initiators, for example, persulfates, such as sodium persulfate ($Na_2S_2O_8$) and potassium persulfate; peroxides, such as hydrogen peroxide and tert-butyl hydroperoxide (t-BHP); and azo compounds, such as VAZO™ initiators; used alone or in combination with one or more reducing agents or activators, for example, bisulfites, metabisulfites, ascorbic acid, erythorbic acid, sodium formaldehyde sulfoxylate (available from Henkel of America, Inc.), ferrous sulfate, ferrous ammonium sulfate, and ferric ethylenediaminetetraacetic acid. Enough initiator is used to promote free-radical polymerization of the monomers.

It is also preferred to employ a small amount (e.g., from about 0.01 to 0.5% by weight of the monomers) of a chain transfer agent or other molecular weight regulator, to control average polymer chain length of the acrylic copolymers. Nonlimiting examples include n-dodecyl mercaptan (n-DDM), t-dodecyl mercaptan (t-DDM), monothioglycerol, mercapto acetates, and long chain alcohols.

The emulsion polymers are prepared with excellent conversions at a reaction temperature of around 70° C., in the presence of from about 0.5 to about 1% by weight, based on the weight of the monomers, of a persulfate or equivalent catalyst, with the monomer mixture being fed over a period of about 3 hours. Reaction pH can be adjusted by addition of sodium bicarbonate or a similar agent, to within a range of from about 4.0 to about 6.0.

While actual production techniques may vary depending upon particular monomer compositions, available equipment, and other considerations, in general, the emulsion polymers are prepared by first mixing one or more pre-emulsions containing conventional surfactants, sodium bicarbonate, and some or all of the monomers in deionized water; adding reactive surfactants and other reactor ingredients (e.g., Fe-EDTA, AR 150, hydrogen peroxide) to a reactor under nitrogen; heating the reactor to 70° C.±2° C. and then adding a pre-emulsion charge, over time (preferably in stepped or mixed feed sequences); adding an initiator charge containing, for example, potassium persulfate; continuing the pre-emulsion feeds and addition of any accelerators; adding any post-reaction charges (e.g., t-BHP, ascorbic acid, and more water); cooling the reactor contents to below 35° C.; and filtering the emulsion polymer. Before filtering the reaction mixture, a biocide, for example, Kathon LX (available as a 1.5% solution from Rohm & Haas, Philadelphia, Pa.), can be added to prevent bacterial growth.

In some embodiments, the copolymers are prepared by sequential polymerization and the monomers are allowed to react in distinct stages. To that end, separate pre-emulsions of monomers, surfactants, initiators and other components are prepared, a reactor is charged with an initial soap (surfactant) solution and catalyst (initiator) solution, a first pre-emulsion of monomers is gradually fed into the reactor, and polymerization is initiated and allowed to propagate. After polymerization of the first pre-emulsion, a second pre-emulsion of monomers is gradually fed into the reactor and polymerization continues. The result is a copolymer system of emulsified copolymer particles quite distinct from emulsion copolymers prepared by batch polymerization. Although not bound by theory, it is believed that sequential polymerization of the two monomeric pre-emulsions results in an emulsion of domain-type copolymeric particles, each having an inner core of first copolymeric composition and an outer shell or region of second copolymeric composition, partially or totally encapsulating the core.

EXAMPLES

In the examples and tables that follow, the following abbreviations are used:

| Monomers | |
|---|---|
| BA | butyl acrylate |
| 2-EHA | 2-ethylhexyl acrylate |
| MA | methyl acrylate |
| VAc | vinyl acetate |
| AA | acrylic acid |
| MAA | methacrylic acid |
| MMA | methyl methacrylate |
| Surfactants | |
| TSPP | sodium pyrophosphate |
| Disponil FES77 | sodium lauryl ether sulfate surfactant |
| Aerosol OT-75 | sodium dioctyl sulfosuccinate surfactant |
| Catalysts, initiators, and other | |
| AWC | sodium formaldehyde sulfoxylate |
| Fe-EDTA | ferric salt of ethylenediaminetetraacetic acid |
| t-BHP | tert-butyl hydroperoxide |
| nDDM | n-dodecyl mercaptan |
| Di-water | deionized water |
| Kathon LX | 3(2H)-isothiazolone, 5-chloro-2-methyl |

Example 1

Water-activatable, emulsion acrylic copolymers were prepared by sequential polymerization using the polymerization protocol described below. The monomer mixture consisted of 12% BA, 48% 2-EHA, 9% MA, 12% VAc, 16% AA, and 3% MAA, based on the total weight of monomers.

Table 1 summarizes the identities and amounts of monomers, surfactants, initiators, and other components used to prepare the acrylic copolymers of Examples 1–3.

A jacketed, multi-neck reaction vessel equipped with nitrogen inlet valve, stirrer and thermometer was charged with initial reactor charge A, and the temperature was raised to 70° C.

In separate vessels, soap solution B and monomer charges C1 and C2 were prepared. Pre-emulsions I and II were prepared by mixing one-half of soap solution B with monomer charge C1 and one-half with monomer charge C2. When the reactor temperature reached 70° C., catalyst charge D was introduced to the reactor in a single shot. At the same time, pre-emulsion I was fed into the reactor over a period of 90 minutes. Thereafter, pre-emulsion II was fed into the reactor, over a second 90 minute period. Accelerator charge E was also fed into the reactor over the course of the 180-minute period during which the monomers were introduced. Thereafter, any unreacted monomers were removed with cook-off catalyst charge F, which was introduced to the reactor over a 30-minute period. The reactor was then cooled to 35° C., and a biocide (Kathon LX) was added to the reactor as a 1.5% aqueous solution.

The resulting emulsion acrylic copolymers had a pH of from about 4.0 to 6.0; a solids content of about 50%, as determined by gravimetric analysis; a viscosity of about 12,500 cps, as determined with a Brookfield viscometer, RV (#4@12 rpm); $T_g$ of about −17° C., as determined by differential scanning calorimetry (DSC); a gel content of about 16%; a number average molecular weight ($M_N$) of from about 12,690 to 14,116; and a weight average molecular weight ($M_W$) of from about 58,000 to 73,000, both $M_N$ and $M_W$ being determined by gel permeation chromatography.

Example 2

Water-activatable emulsion acrylic copolymers were prepared as in Example 1, but without using sequential polymerization. Instead, a single monomer charge C was pre-emulsified and fed into the reactor over a 180-minute period. The copolymers had a pH of about 4.0 to 6.0; a 50% solids content; a viscosity of about 5,900 cps; $T_g$ of about −17° C.; a gel content of about 28%; $M_N$ of from about 12,400 to 13,400; and $M_W$ of from about 77,000 to 86,000.

Example 3

Acrylic copolymers were prepared using the sequential polymerization reaction protocol of Example 1, but the monomer charges also included methyl methacrylate. Monomer weight percentages were 12% BA, 46% 2-EHA, 8% MA, 12% VAc, 15% AA, 3% MAA, and 5% MMA. The resulting copolymers had a pH of about 4.0 to 6.0; a 52% solids content; a viscosity of about 20,000 cps; and a $T_g$ of about −15° C. The copolymers of Example 3 exhibited poor image transfer properties, as compared to the transfer properties of Examples 1 and 2.

TABLE 1

Polymerization Reaction Formulations

| | Example 1 Mass (g) | | | | Example 2 Mass (g) | | Example 3 Mass (g) | | | |
|---|---|---|---|---|---|---|---|---|---|---|
| Reaction Component | Charge 1 | Charge 2 | 1 + 2 | 1 + 2, dry basis | Charge 1 | 1, dry basis | Charge 1 | Charge 2 | 1 + 2 | 1 + 2, dry basis |
| A) Initial reactor charge | | | | | | | | | | |
| Di-water | 210 | | 210 | 0 | 210 | 0 | 210 | | 210 | 0 |
| Disponil FES77(32.5%) | 5 | | 5 | 1.6 | 5 | 1.6 | 5 | | 5 | 1.6 |
| Fe-EDTA | 0.1 | | 0.1 | 0.1 | 0.1 | 0.1 | 0.1 | | 0.1 | 0.1 |
| B) Soap solution | | | | | | | | | | |
| Di-water | 180 | | 180 | 0 | 180 | 0 | 180 | | 180 | 0 |
| TSPP(59.7%) | 2 | | 2 | 1.2 | 2 | 1.2 | 2 | | 2 | 1.2 |
| Disponil FES77 | 55 | | 55 | 17.9 | 55 | 17.9 | 55 | | 55 | 17.9 |
| Aerosol OT75(75%) | 6 | | 6 | 4.5 | 6 | 4.5 | 6 | | 6 | 4.5 |
| C) Monomers and n-DDM | | | | | | | | | | |
| BA | 55.5 | 15.5 | 71 | 71 | 72 | 72 | 55.5 | 15.5 | 71 | 71 |
| 2-EHA | 223 | 55.8 | 278.8 | 278.8 | 278.8 | 278.8 | 223 | 55.8 | 278.8 | 278 |
| MA | 40 | 10 | 50 | 50 | 50 | 50 | 40 | 10 | 50 | 50 |
| VAc | 70 | 0 | 70 | 70 | 70 | 70 | 70 | 0 | 70 | 70 |
| AA | 30 | 62 | 92 | 92 | 92 | 92 | 30 | 62 | 92 | 92 |
| MAA | 6 | 10 | 16 | 16 | 16 | 16 | 6 | 10 | 16 | 16 |
| MMA | 0 | 0 | 0 | 0 | 0 | 0 | 24 | 4 | 28 | 28 |
| n-DDM | 1.5 | 0.2 | 1.7 | 1.7 | 1.7 | 1.7 | 1.5 | 0.2 | 1.7 | 1.7 |
| D) Catalyst charge | | | | | | | | | | |
| Di-water | 15 → | | 15 | 0 | 15 | 0 | 15 → | | 15 | 0 |
| Sodium Bicarbonate | 9 → | | 9 | 9 | 9 | 9 | 9 → | | 9 | 9 |
| Potassium persulfate | 2.25 → | | 2.25 | 2.25 | 2.25 | 2.25 | 2.25 → | | 2.25 | 2.25 |
| E) Accelerator | | | | | | | | | | |
| Di-water | 80 → | | 80 | 0 | 80 | 0 | 80 → | | 80 | |
| AWC | 0.75 → | | 0.75 | 0.75 | 0.75 | 0.75 | 0.75 → | | 0.75 | |
| F) Cook-off catalyst | | | | | | | | | | |
| t-BHP | 1 | | 1 | 0.7 | 1 | 0.7 | 1 | | 1 | 0.7 |
| Di-water | 2 | | 2 | 0 | 2 | 0 | 2 | | 2 | 0 |
| Ascorbic acid | 0.1025 | | 0.1025 | 0.1025 | 0.1025 | 0.1025 | 0.1025 | | 0.1025 | 0.1025 |
| H) Biocide | | | | | | | | | | |
| Kathon LX 1.5% | 0.81 | | 0.81 | 0.01 | 0.81 | 0.01 | 0.81 | | 0.81 | 0.01 |

Because the acrylic copolymers of the present invention are non-tacky to the touch when dry, evaluating their adhesive performance is problematic. Nevertheless, shear strength, 90° peel and 180° peel data were obtained for the copolymers of Example 2, using the following technique: test samples were prepared by coating the polymers on a silicone-coated release paper using a bull nose coater, and drying the adhesive for 15 minutes at 70° C. The dry coat weight was about 20 g/m². The dried sample was then wiped with a damp paper towel, thereby activating the adhesive, and laminated to a paper face stock (50 lb/ream DSX™ paper, a bright white, uncoated paper designed for high speed converting, from Avery Dennison's Fasson Roll Division, Painesville, Ohio), and the release liner was removed. The exposed acrylic copolymer face was then wiped with a damp paper towel, thereby activating the adhesive, and then adhered to a glass or stainless steel panel, and standard shear, 90° peel, and 180° peel tests were performed.

More particularly, shear was determined in accordance with Pressure-Sensitive Tape Council (PSTC) test method #7 (6th Ed.) The overlap dimensions were ½ xin. ½ in., with a static load of 500 g. The test was conducted at room temperature at a 20 ft/min. draw rate.

90° peel was determined in accordance with PSTC test #2 (6th Ed.) The dwell time was 20 minutes and the pull rate was 12 m/min.

180° peel was determined in accordance with PSTC test #1 (6th Ed.). The dwell period was 20 minutes and the pull rate was 12 m/min.

The results of the adhesive performance tests are presented in Table 2. Failure modes, namely, paper tear, are indicated in parentheses as "pt". Peel values were determined from the untorn sections of the samples, prior to face stock failure.

TABLE 2

Adhesive Performance of Example 2

| Shear (min.) | 90° Peel (lb/in.) | | 180° Peel (lb/in.) | |
|---|---|---|---|---|
| Stainless Steel | Stainless Steel | Glass | Stainless Steel | Glass |
| 56 min.. | 1.6 (pt) | 1.9 (pt) | 2.9 (pt) | 3.6 (pt) |

Water-activatable pressure-sensitive adhesives prepared in accordance with the present invention are particularly useful as the ink-receptive adhesive component of image transfer sheets, one embodiment of which is shown in the FIGURE. The image transfer sheet 10 comprises 4 primary elements: a flexible backing 20, a water-impermeable layer or layers 40, a hydrophilic, ink-receptive, water-activatable adhesive 60, and a protective, water-soluble detach layer 80.

More particularly, in a preferred embodiment, the flexible backing preferably comprises a paper sheet 20, having an outer surface 22 and an inner surface 24. A very thin layer of low-density polyethylene (LDPE) 26 is coated on the inner surface 24 of the paper sheet. A nonlimiting example of LDPE-coated paper is 92 lb. per ream coated paper sold as 9 LDMT-70 bleached/13 LDTL, available from Jen-Coat, Inc. (Wesleyan, Mass.).

Coated atop the LDPE-coated paper is a first layer 40a of water-insoluble UV varnish. The varnish can be applied as a liquid and then cured with ultraviolet (UV) light. In one embodiment, the varnish is applied at a coat weight (measured after drying) of from about 1–5 $g/m^2$, more preferably, about 2.5 to 4.5, $g/m^2$. Alternatively, a thin layer (approximately 0.5 $g/m^2$) of silicone is used in place of the UV varnish layer 40a.

A second UV varnish layer 40b, also insoluble in water, is coated on the first UV varnish layer. Because the layers 40a and 40b are applied in separate coating steps, they are separable from one another across their interface 42. The second layer of UV varnish is applied to the dried, first layer of UV varnish at a coating of about 4 to 6 $g/m^2$.

Nonlimiting examples of UV varnishes include Envirocure UV-1801, available from Environmental Ink and Coating Corp. (Morgantown, N.C.), and Clear Coating RCA 01291R, available from Sun Chemical (Rochester, N.Y.). Envirocure UV-1801 is non-yellowing, offers good flexibility and resistance to cracking, provides rapid cure response, and provides good scuff resistance. Clear Coating RCA 01291R is light- and temperature-stable and exhibits high gloss and lay, with excellent adhesion.

A thin (approximately 0.5 $g/m^2$) layer of silicone can be used as an alternative to the first UV varnish layer. Other UV varnish alternatives include water-based, solvent-based, and hot melt varnishes.

A first layer of water-receptive, water-activatable acrylic polymers 60a, prepared as described above, is coated directly on the second UV varnish layer 40b, preferably at a dry coat weight of from about 20 to 25 $g/m^2$. This first layer of acrylic polymers is water-activatable, becoming tacky when wet. It is preferably applied using a Meyer rod. A much thinner layer of water-receptive, water-activatable acrylic copolymers 60b is applied directly to the first layer of acrylic copolymers 60a, using a flexo-gravure coating technique, at a coat weight of from about 2 to 5 $g/m^2$. By applying the second layer of copolymers 60b flexographically, any wire marks in the first layer 60a are filled-in, the roughness of the adhesive coating is reduced by 50 to 70%, and the appearance of the final product is improved. A water-soluble, protective detach layer 80 is coated on the outer surface of the second layer of acrylic copolymers 60b. The detach layer preferably is comprised of polyacrylic acid (PAA), polyvinyl alcohol (PVOH) and a water-soluble starch, and is applied as a water-based coating (approximately 8 to 9% solids), which is then dried to a coat weight of from about 1 to 2 $g/m^2$. A preferred detach layer is applied as a coating comprising 3% PAA, 2% PVOH, 3.5% starch and 91.5% water, on a percent-by-weight basis. More generally, suitable detach layers can be prepared using between about 1 to 8% PAA, 1 to 5% PVOH, and 2 to 10% starch. Preferably, a biocide, such as Kathon LX, available as a 1.5% solution from Rohm & Haas (Philadelphia, Pa.), is added to enhance shelf life.

Although not essential to the image transfer sheet, the detack layer improves product handling and storage, enhances sheet feeding through desktop printers, and generally protects the water-activatable copolymer layers from atmospheric humidity. Properly formulated, as in the preferred embodiment, the detack layer also facilitates a clean break between the printed image and the non-imaged regions of the image transfer sheet. The starch promotes a clean break by rendering the detack layer somewhat brittle. In contrast, films made entirely of PVOH are less brittle and would tend to transfer un-imaged regions along with the imaged regions of the sheet. The starch also helps balance the very hydroscopic PAA. A detack layer formed entirely of PAA, when exposed to a humid environment, would likely become tacky to the touch as it absorbed ambient moisture from the air.

The non-aqueous components of the detack layer—PAA, PVOH, and starch—are available from a variety of vendors, well-known to those skilled in the art of adhesive and printable construction formulations. A presently preferred PVOH is Airvol 107, a water-soluble polymer made by alcoholysis of polyvinyl acetate, available from Air Products & Chemicals, Inc. (Allentown, Pa.). Airvol 107 combines high tensile strength with ease of film formation. A presently preferred starch is Cerestar 12640 Polar Tex-Instant Starch, a pre-gelatanized, stabilized and crosslinked, waxy maize starch (hydroxypropyl distarch phosphate), having a minimum particle size of 90, available from Cerestar U.S.A., Inc. (Hammond, Ind.).

The detack layer can be reformulated depending on the application envisioned for the image transfer sheet. For example, where the image transfer sheet is to be used to transfer water-removable "tatoos" to the skin, the detack layer is formulated in one embodiment with 84.5% water, 2.0% Airvol 107 starch, 10% water-activatable adhesive, and 1.5% Kathon LX biocide. The adhesive (described above) imparts additional tack when wet to promote adhesion to the skin.

It will be appreciated that the thicknesses of each of the layers 20–80 are exaggerated in FIG. 1. In practice, image transfer sheets can be prepared as thin sheets or rolls, such as sheets of labels where, for example, the water-activatable polymer layer has a thickness of from between 0.5 and 2 mils and the flexible backing has a similar small dimensional thickness. More preferably, the two layers of water-activatable copolymers have a combined thickness that is sufficiently great as to minimize dot gain—lateral movement of a dot of ink imprinted on the image transfer sheet. Although, to some degree, this is printer-dependent, in general dot gain can be minimized by constructing the image transfer sheets with water-absorbent materials (i.e., the water-activatable copolymer layers plus the detack layer) having a combined thickness of about one mil (about 0.025 mm).

The image transfer sheet 10 is non-tacky when dry, at room temperature and normal relative humidity (less than about 25% RH). The detack layer 80, however, is water-soluble, and the water-activatable copolymer layers 60a and 60b are water-receptive and become tacky when exposed to even a small amount of moisture, such as the water in a water-based ink jet ink. Consequently, when the image transfer sheet is passed through an ink jet printer and imprinted with an image, tacky regions form in the upper layers 60a, 60b and 80 of the sheet. These layers are thin and water-receptive, and they become activated across their entire cross-sectional thickness, from the outer surface of the detack layer 80 to the interface between the first hydrophilic, water-activatable polymer 60a and the second UV varnish layer 40b. Thus, although printed on the detack layer face of the sheet, the sheet becomes tacky all the way through to the second UV varnish layer, which is water-resistant.

The printed image can be transferred directly to an object by applying the now tacky top surface of the sheet to the object, using manual pressure, and peeling away the unactivated regions of the sheet along with the first UV varnish film layer and the flexible backing. A clean break forms between the imaged (tacky) and non-imaged (non-tacky) regions of the construction. The clean break is facilitated by the brittle detack layer 80 (made brittle by the starch) and the brittle second (inner) UV varnish layer 40. What remains is a crisp, transferred image, protected on its outer surface by the second UV varnish film layer.

Printing tests conducted with Examples 1–3 reveal that the water-activatable acrylic copolymers of Examples 1 and 2 can be used to form image transfer sheets that provides good image transfer—generally exceeding 80%, and even achieving 100% image transfer—after being run through an ink jet printer and applied to a substrate. Similar constructions prepared using example 3, however, provided less satisfactory results, with only partial image transfer.

Using a water-activatable composition prepared in accordance with Example 2 of the present invention, image transfer sheets were constructed in the above-described manner, printed with a solid image in an ink jet printer, and applied to 24 different substrates so that the quality of the transferred images could be evaluated. In each case, the water-activatable copolymers were applied at a coat weight of about 24 to 30 g/m$^2$ (dry weight). After applying an imaged sheet to a substrate at room temperature, using manual pressure, the imaged sheet was allowed to dwell on the substrate for about one to three minutes before peeling back the release liner and the non-imaged areas of the sheet. This allowed any excess moisture in the sheet to permeate the porous substrates. The release liner and non-imaged areas of the sheet were then peeled away, leaving the image transferred to the substrate. In general, images on glass substrates were given about two or three minutes of dwell, while images on paper substrates, which absorb moisture, were allowed to dwell for about one minute. The image transfer test results are presented in Table 3.

TABLE 3

Image Transfer Test Results

| No. | Test Substrate | Image Quality |
|---|---|---|
| 1 | Xerox Paper | Good |
| 2 | Glossy Paper | Good |
| 3 | File Folder | Good |
| 4 | Report Cover | Good |
| 5 | Sheet Protector | Good |
| 6 | Vinyl Binder - White | Good |
| 7 | Polypropylene Binder | Poor |
| 8 | Glass | Good |
| 9 | Mirror | Good |
| 10 | Smooth Cardboard | Good |
| 11 | Stainless Steel | Good |
| 12 | Aluminum | Good |
| 13 | Painted Metal | Good |
| 14 | Pine Wood | Poor |
| 15 | Plywood | Poor |
| 16 | Painted Wood | Good |
| 17 | Panel Wood | Good |
| 18 | Ceramic | Good |
| 19 | Formica | Good |
| 20 | Transparency | Good |
| 21 | Cabinet Wood | Good |
| 22 | Manila Folder | Good |
| 23 | Toys (waxy surface) | Poor |
| 24 | Cloth - 100% Cotton (T-shirt) | Good |

As indicated in Table 3, the compositions of the present invention facilitated good image transfer to all but four of the test substrates, at room temperature. The terms "good," "fair" and "poor" are used to describe image transfer from the imprinted transfer sheet to the substrate. For a solid image having a well-defined, smooth border, the term "good" means the image transferred cleanly (more or less completely) to the substrate; "fair" means the transferred image has a broken border, but otherwise the image transferred well; and "poor" means the transferred image is broken, with only partial transfer. For all but four of the substrates listed in Table 3, constructions made with the water-activatable acrylic copolymers formulated according to Example 2 provided good image transfer, and essentially 100% of the imprinted image was transferred from the image transfer sheet to the substrate. In contrast, it is thought that the best commercially available image transfer sheets provide only 60% to 80% image transfer. Waxy surfaces and exposed, rough wood surfaces did not accept image transfer well. Image transfer was improved when the release liner was peeled off in a fast, fluid motion, as opposed to a slow peel-off.

The best results were seen with solid images and images having a solid border. Small, intricate designs with multiple un-imaged regions tended to show poorer image transfer. Image transfer also tends to fall with decreasing ink content in the imaged regions. Thus, pale images (e.g., light blue, pink, etc.) tend to transfer less completely than do bright, solid color images. In general, high ink coverage, expressed as dpi (dots per inch) yield better quality images and better image transfer.

Another phenomenon sometimes observed with image transfer constructions is the "trailing edge" effect, which may occur when the imprinted transfer sheet is peeled away from a substrate after applying the image to the substrate. This appears to be a function of the peel angle and shear forces involved in peeling the transfer sheet away from the substrate. When the affixed transfer sheet is grasped at one end and lifted away from the substrate, the initial peel angle is acute, and relatively low shear forces are encountered. At the end of the process, however, as the trailing edge of the image transfer sheet is peeled away from the substrate and the transferred image, the peel angle is obtuse, and greater shear forces are encountered.

With well-defined, solid images having generally smooth borders, the un-imaged portions of the transfer sheet break away cleanly from the imaged regions, which are left behind on the substrate and are crisp and distinct. With irregular, intricate designs, and/or very light (low color density) images, however, a small portion of the un-imaged transfer sheet may not completely detach from the trailing edge of the imaged region but, instead, may be left behind on the substrate. If this occurs, the small amount of non-imaged, residual transfer sheet material can be removed without affecting the transferred image by pressing a piece of tape over the residue and lifting the residue from the substrate.

To evaluate the color quality of images printed on image transfer sheets prepared in accordance with the present invention, color density tests were conducted with three different ink jet printers: Canon (Bubble Jet) 620, Hewlett Packard 694C, and Epson Stylus 600. In each case, an image transfer sheet ("sample") was fed through an ink jet printer set at 360 dpi and imprinted with a colored image (yellow, cyan, black, or magenta). The image was transferred to a white photocopy paper substrate and evaluated for color density (a measurement of the intensity of light reflected from the printed image, expressed as a dimensionless quantity), using an X-Rite™ densitometer, Model No. 428. For comparison, regular photocopy paper ("paper") was also imprinted with the same colored images and evaluated for color density. High color densities are preferable to low color densities, and a difference of 0.05 units or more is considered significant. The test results are presented in Table 4.

TABLE 4

Color Density Test Results

| Color | Ink Jet Printer | | |
|---|---|---|---|
| | Canon | HP | Epson |
| Yellow | | | |
| * Paper | 0.86 | 0.87 | 0.81 |
| * Sample | 0.60 | 0.81 | 1.22 |
| Cyan | | | |
| * Paper | 0.99 | 1.08 | 1.10 |
| * Sample | 0.75 | 1.09 | 1.42 |
| Black | | | |
| * Paper | 1.10 | 1.03 | 1.25 |
| * Sample | 1.20 | 1.29 | 2.21 |
| Magenta | | | |
| * Paper | 1.04 | 1.05 | 0.99 |
| * Sample | 1.21 | 1.14 | 1.56 |

As indicated in Table 4, the image transfer sheets of the present invention were readily imprinted in all three ink jet printers. Images transferred from the sheets were characterized by high color densities, higher even than the densities on plain photocopy paper, for most colors.

It will be appreciated that, due to the water-absorbent nature of the detack layer and the water-activatable polymer (adhesive) layers, a transferred image that has been applied to a substrate can be removed from the substrate by, e.g., swiping the image with a damp cloth. The UV varnish film protecting the image can be removed with an ordinary household cleaner. In some applications, however, more permanent images are desired and can be formed by, e.g., incorporating one or more crosslinking components or layers into the construction. For example, a crosslinking promoter layer can be coated on top of one or more layers of the water-activatable polymers. Crosslinking could then be promoted by activation with the water in an ink jet ink, with the water carrying the crosslinking agents down into the water-activatable copolymer layer(s) as it migrates into the construction. Non-limiting examples of crosslinking promoters include zinc, aluminum, and zirconium salts, such as zinc acetate, zinc octoate, aluminum acetylacetonate, and zirconyl ammonium carbonate. 0.2 to about 2% by weight of such crosslinkers can be coated on the uppermost layer of water-activatable polymers to form a percolating crosslinker layer.

In another embodiment, an epoxy-functionalized monomer, such as glycidyl methacrylate (GMA), can be added to the monomer mixture used to prepare the water-activatable copolymers. Heat-activated crosslinking (at, e.g., about 120° C.) should result in a water-permanent, three dimensional matrix. A non-limiting example of crosslinking through epoxy-containing PSAs is found in U.S. Pat. No. 4,812,541 (Mallya et al.), which is incorporated herein by reference. Alternatively, improved water-resistance can be targeted by including a fluoroacrylate monomer, such as trifluoroethyl methacrylate, in the monomer mixture. The resulting polymer, though water-activatable, should also be somewhat water-permanent.

Other variations and modifications also fall within the scope of the invention. For example, a UV-curable adhesive can be employed as a second adhesive. Instead of coating two layers of the above-described water-activatable polymers, a UV-curable PSA can be substituted for one of the water-activatable layers, adjacent to the UV varnish. Once cured, the UV-curable PSA layer should improve the water-fastness or permanence of the transferred image. Nonlimiting examples of UV-curable PSAs are found in U.S. Pat. No. 5,686,504 (Ang), incorporated by reference herein. Other suitable UV-curable adhesives are available from National Starch and Chemical Co. (Bridgewater, N.J.), Reichhold Chemicals, Inc. (Research Triangle Park, N.C.) and H.B. Fuller Co. (St. Paul, Minn.).

Other image transfer constructions and uses for the water-activatable acrylic copolymers described herein are found in the U.S. patent application entitled "Image Transfer Sheets and a Method of Manufacturing the Same," filed concurrently with this application and incorporated herein by reference. That application also discloses a preferred method of manufacturing image transfer sheets.

The present invention is not limited to use with ink jet printers, but may be utilized with other printers, pens, and applicators that use water-based inks, and may also work with comparable hydroxylated solvents, such as isopropanol. In each case, the acrylic copolymers become activated (tacky) when exposed to water or solvent, and the tacky region(s) of an imaged sheet becomes transferable to a substrate. Nor is the invention limited to printed text, i.e., alpha-numeric characters. To the contrary, the adhesives and constructions described herein are intended to be used in a variety of applications, with all manner of graphic, as well as textual, images.Thus, a child can draw on an image transfer sheet with a water-based ink, thereby activating the imaged regions of the sheet, and then transfer the drawing to a substrate using manual pressure.

Throughout the description and the claims, use of the word "about" in relating to a range of numbers is intended to modify both the low and high values recited.

What is claimed is:

1. A water-activatable, adhesive comprising acrylic copolymers which (a) when cast as a film and dried, are non-tacky to the touch, and (b) when imprinted with an image, become tacky and capable of providing good image transfer to a substrate,
   wherein the copolymers are formed from a mixture of monomers comprising, based on the total weight of monomers,
     (a) about 40 to 70% by weight of one or more alkyl acrylates, the alkyl group of which has about 4 to about 8 carbon atoms;
     (b) about 5 to 15% by weight of methyl acrylate;
     (c) about 5 to 20% by weight of vinyl acetate; and
     (d) about 5 to 25% by weight of methacrylic acid, acrylic acid, or a mixture of methacrylic acid and acrylic acid.

2. A water-activatable adhesive as recited in claim 1, wherein the copolymers are emulsion copolymers.

3. A water-activatable adhesive as recited in claim 1, wherein the one or more alkyl acrylates are selected from the group consisting of butyl acrylate, ethylhexyl acrylate, isooctyl acrylate, and mixtures thereof.

4. A water-activatable adhesive as recited in claim 1, wherein the monomer mixture includes both butyl acrylate and 2-ethylhexyl acrylate.

5. A water-activatable adhesive as recited in claim 1, wherein the monomer mixture includes about 1 to 5% by weight of methacrylic acid and about 5 to 20% by weight of acrylic acid.

6. A water-activatable adhesive as recited in claim 1, wherein the monomer mixture comprises, on a percent by weight basis, based on the total weight of monomers, about 12% butyl acrylate, about 48% 2-ethylhexyl acrylate, about 9% methyl acrylate, about 12% vinyl acetate, about 16% acrylic acid, and about 3% methacrylic acid.

7. A water-activatable adhesive as recited in claim 1, wherein the acrylic copolymers are capable of providing at least 80% image transfer.

8. A water activatable adhesive comprising:

acrylic copolymers comprising a monomer mixture comprising, on a percent by weight basis based on the total weight of the monomers:

about 10 to 20% butyl acrylate,
about 40 to 60% 2-ethylhexyl acrylate,
about 5 to 15% methyl acrylate,
about 5 to 15% vinyl acetate,
about 1 to 5% methacrylic acid, and
about 5 to 20% acrylic acid, said copolymers, when cast as a film and dried, being non-tacky to the touch, and, when imprinted with a solid image in an ink-jet printer, becoming tacky and capable of providing good image transfer of the image to a substrate.

* * * * *